US008238551B2

(12) United States Patent
Reznik et al.

(10) Patent No.: US 8,238,551 B2
(45) Date of Patent: Aug. 7, 2012

(54) GENERATION OF PERFECTLY SECRET KEYS IN WIRELESS COMMUNICATION NETWORKS

(75) Inventors: Alexander Reznik, Titusville, NJ (US); Akinlolu Oloruntosi Kumoluyi, Marietta, GA (US); Guodong Zhang, Farmingdale, NY (US); Prabhakar R. Chitrapu, Blue Bell, PA (US); Gregory S. Sternberg, Mt. Laurel, NJ (US); Yogendra C. Shah, Exton, PA (US); Alain Charles Louis Briancon, Poolesville, MD (US); Chunxuan Ye, King of Prussia, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 1022 days.

(21) Appl. No.: 11/339,958

(22) Filed: Jan. 26, 2006

(65) Prior Publication Data

US 2007/0177729 A1    Aug. 2, 2007

Related U.S. Application Data

(60) Provisional application No. 60/647,482, filed on Jan. 27, 2005.

(51) Int. Cl.
*H04L 9/00*    (2006.01)
*H04L 9/32*    (2006.01)
(52) U.S. Cl. ........................................ 380/44; 713/171
(58) Field of Classification Search .................... 380/21, 380/44, 201, 44.47, 270, 276, 277; 713/189, 713/200, 201; 455/11, 410; 714/790
See application file for complete search history.

(56) References Cited

U.S. PATENT DOCUMENTS

| 4,019,140 | A | * | 4/1977 | Swerdlow .................... 455/63.1 |
| 4,140,973 | A | * | 2/1979 | Stevens ......................... 455/62 |
| 4,200,770 | A | | 4/1980 | Hellman et al. |
| 4,429,180 | A | * | 1/1984 | Unkenholz .................. 380/283 |
| 4,882,737 | A | | 11/1989 | Dzung |
| 5,161,244 | A | * | 11/1992 | Maurer .......................... 380/43 |
| 5,450,456 | A | | 9/1995 | Mueller |

(Continued)

FOREIGN PATENT DOCUMENTS

JP    H-10-512727    12/1998

(Continued)

OTHER PUBLICATIONS

Cover T. M. et al., "Network Information Theory," *Elements of Information Theory*, pp. 374-458, (John Wiley & Sons, Inc. 1991) (Internet Publishing Date 2001) downloaded from http://dx.doi.org/10.1002/0471200611.ch14.

(Continued)

*Primary Examiner* — Nathan Flynn
*Assistant Examiner* — Abdullah Almamun
(74) *Attorney, Agent, or Firm* — Woodcock Washburn LLP (57) ABSTRACT

A method and apparatus is used for generating a perfectly random secret key between two or more transceivers in a wireless communication network. In a point-to-point system, both transceivers produce an estimate of the channel impulse response (CIR) based on the received radio signal. The CIR estimation is synchronized and may include error correction and detection. A long secret key of bits is generated from a digitized version of the CIR estimate, from which a perfectly secret encryption key is derived by privacy amplification.

34 Claims, 3 Drawing Sheets

U.S. PATENT DOCUMENTS

| | | | |
|---|---|---|---|
| 5,604,806 A | 2/1997 | Hassan et al. | |
| 5,745,578 A * | 4/1998 | Hassan et al. | 380/44 |
| 5,970,060 A | 10/1999 | Baier et al. | |
| 5,995,499 A * | 11/1999 | Hottinen et al. | 370/337 |
| 5,995,533 A | 11/1999 | Hassan et al. | |
| 6,031,913 A * | 2/2000 | Hassan et al. | 380/44 |
| 6,157,619 A | 12/2000 | Ozluturk et al. | |
| 6,182,214 B1 * | 1/2001 | Hardjono | 713/163 |
| 6,362,782 B1 | 3/2002 | Greenspan et al. | |
| 6,377,792 B1 * | 4/2002 | Brown et al. | 455/411 |
| 6,438,367 B1 | 8/2002 | Crawford | |
| 6,483,865 B1 | 11/2002 | Beierle | |
| 6,487,294 B1 | 11/2002 | Alexander | |
| 6,532,290 B1 | 3/2003 | Dent | |
| 6,904,110 B2 * | 6/2005 | Trans et al. | 375/350 |
| 6,978,022 B2 | 12/2005 | Okimoto et al. | |
| 6,980,602 B1 * | 12/2005 | Kleinerman et al. | 375/262 |
| 7,006,633 B1 * | 2/2006 | Reece | 380/260 |
| 7,065,371 B1 * | 6/2006 | Kleinerman | 455/464 |
| 7,246,240 B2 * | 7/2007 | Chuang et al. | 713/176 |
| 7,307,275 B2 * | 12/2007 | Lidar et al. | 257/31 |
| 7,333,611 B1 * | 2/2008 | Yuen et al. | 380/256 |
| 7,403,623 B2 * | 7/2008 | Cerf et al. | 380/278 |
| 7,515,714 B2 * | 4/2009 | Orihashi et al. | 380/255 |
| 7,587,598 B2 | 9/2009 | Ohba et al. | |
| 2001/0036268 A1 | 11/2001 | Kuroda et al. | |
| 2001/0038674 A1 | 11/2001 | Trans | |
| 2002/0044654 A1 | 4/2002 | Maeda et al. | |
| 2002/0106084 A1 * | 8/2002 | Azuma et al. | 380/263 |
| 2002/0131592 A1 * | 9/2002 | Hinnant | 380/46 |
| 2002/0141591 A1 | 10/2002 | Hawkes et al. | |
| 2002/0183075 A1 * | 12/2002 | Fauconnier | 455/456 |
| 2003/0115453 A1 | 6/2003 | Grawock | |
| 2003/0126551 A1 | 7/2003 | Mantha et al. | |
| 2004/0193971 A1 * | 9/2004 | Soong et al. | 714/704 |
| 2005/0084031 A1 * | 4/2005 | Rosen et al. | 375/295 |
| 2007/0036353 A1 * | 2/2007 | Reznik et al. | 380/30 |
| 2007/0063884 A1 * | 3/2007 | Iwamura et al. | 341/156 |
| 2007/0076871 A1 | 4/2007 | Renes | |
| 2008/0090572 A1 * | 4/2008 | Cha et al. | 455/436 |
| 2008/0282127 A1 * | 11/2008 | Mantha et al. | 714/751 |
| 2008/0304658 A1 * | 12/2008 | Yuda et al. | 380/44 |

FOREIGN PATENT DOCUMENTS

| | | |
|---|---|---|
| JP | 2000-512825 | 9/2000 |
| JP | 2002-091305 | 3/2002 |
| JP | 2002-158640 | 5/2002 |
| JP | 2002-217888 | 8/2002 |
| JP | 2003-273856 | 9/2003 |
| JP | 2004-032679 | 1/2004 |
| JP | 2004-056762 | 2/2004 |
| JP | 2004-187197 | 7/2004 |
| JP | 2004-201288 | 7/2004 |
| JP | 2004-208073 | 7/2004 |
| JP | 2004-274931 | 9/2004 |
| JP | 2005-020310 | 1/2005 |
| JP | 2005-130127 | 5/2005 |
| JP | 2005-176320 | 6/2005 |
| JP | 2006-180549 | 7/2006 |
| TW | 550926 | 9/2003 |
| TW | 200306125 A | 11/2003 |
| TW | 200418297 | 9/2004 |
| WO | 00/10317 | 2/2000 |
| WO | 00/30319 | 5/2000 |
| WO | WO 02/09344 A1 | 1/2002 |
| WO | WO 02/008449 A1 | 10/2002 |
| WO | WO 2006-011345 | 2/2006 |
| WO | WO 2006-013699 | 9/2006 |
| WO | WO 2006-013798 | 9/2006 |

OTHER PUBLICATIONS

IEEE 802 Committee, IEEE P802.11r™ /D0.01, Jun. 2005 (Draft Amendment to IEEE Std 802.11™, 2005 (based on 802.1ma D1.0), 802.11e™-2005, 802.11k-????), *Draft Amendment to Standard for Information Technology—Telecommunications and information exchange between systems—LAN/MAN—Specific Requirements*, Part 11: Wireless Medium Access Control (MAC) and Physical (PHY) Specifications Amendment 8: FAST BSS Transition, (2005 IEEE Computer Society, IEEE 802 Committee).

IEEE 802 Committee, IEEE P802.11r™ /D1.0, Nov. 2005 (Draft Amendment to IEEE STD 802.11™, 2005 (based on 802.1ma D4.0), 802.11e™-2005, 802.11k-D3.0), *Draft Amendment to Standard for Information Technology—Telecommunications and information exchange between systems—LAN/MAN—Specific Requirements*, Part 11: Wireless Medium Access Control (MAC) and Physical Layer (PHY) Specifications, Amendment 2: Fast BSS Transition, (2005 IEEE Computer Society, IEEE 802 Committee).

IEEE LAN/MAN Standards Committee, ANSI/IEEE Std. 802.11, 1999 Edition (R2003), *Information Technology—Telecommunications and informaton exchange between systems—Local and metropolitan area networks—Specific Requirements*, Part 11: Wireless LAN Medium Access Control (MAC) and Physical Layer (PHY) Specifications (Reaffirmed Jun. 12, 2003, IEEE Computer Society, LAN/MAN Standards Committee).

IEEE LAN/MAN Standards Committee, IEEE STD 802.11i™-2004 (Amendment to IEEE STD 802.11™, 1999 Edition (Reaff 2003)), *IEEE Standard for Information Technology—Telecommunications and information exchange between systems—Local and Metropolitan area networks—Specific Requirements*Part 11: Wireless LAN Medium Access Control (MAC) and Physical Layer (PHY) Specifications Amendment 6: Medium Access Control (MAC) Security Enhancements, (Jul. 23, 2004 IEEE Computer Society, LAN/MAN Standards Committee).

IEEE LAN/MAN Standards Committee, IEEE Std 802.1X™-2004 (Revision of IEEE Std 802-1x-2001), *IEEE Standard for Local and Metropolitan Area Networks*, Port-Based Network Access Control, (Dec. 13, 2004, IEEE Computer Society, LAN/MAN Standards Committee).

Maurer et al., Unconditionally Secure Key Agreement and the Intrinsic Conditional Information, *IEEE Transactions on Information Theory*, vol. 45, pp. 499-514, (1999).

Burrows-Wheeler Transformation /Block Sorting (BWT) at http://www.data-compression.info/Algorithms/BWT/index.htm, downloaded May 16, 2007.

Csiszár et al., Secrecy Capacities for Multiple Terminals, *IEEE Transactions on Information Theory*, vol 50, No. 12, pp. 3047-3061, (Dec. 2004).

IEEE 802 Committee, IEEE P802.11r™/D0.01, Jun. 2005 (Draft Amendment to IEEE Std 802.11™, 2005 (based on 802.1ma D1.0), 802.11e™-2005, 802.11k-????), *Draft Amendment to Standard for Information Technology—Telecommunications and information exchange between systems—LAN/MAN—Specific Requirements*, Part 11: Wireless Medium Access Control (MAC) and Physical Layer (PHY) Specifications Amendment 8: Fast BSS Transitions, (2005 IEEE Computer Society, IEEE 802 Committee).

IEEE 802 Committee, IEEE P802.11r™/D1.0, Nov. 2005 (Draft Amendment to IEEE Std 802.11™, 2005 (based on 802.1ma D4.0), 802.11e™-2005, 802.11k-D3.0), *Draft Amendment to Standard for Information Technology—Telecommunications and information exchange between systems—LAN/MAN—Specific Requirements*, Part 11: Wireless Medium Access Control (MAC) and Physical Layer (PHY) Specifications, Amendment 2: Fast BSS Transition, (2005 IEEE Computer Society, IEEE 802 Committee).

IEEE LAN/MAN Standards Committee, ANSI/IEEE Std. 802.11, 1999 Edition (R2003), *Information Technology—Telecommunications and information exchange between systems—Local and metropolitan area networks—Specific Requirements*, Part 11: Wireless LAN Medium Access Control (MAC) and Physical Layer (PHY) Specifications (Reaffirmed Jun. 12, 2003, IEEE Computer Society, LAN/MAN Standards Committee).

IEEE LAN/MAN Standards Committee, IEEE STD 802.11i™-2004 (Amendment to IEEE Std 802.11™, 1999 Edition (Reaff 2003)). *IEEE Standard for Information Technology—Telecommunications and information exchange between systems—Local and metropolitan area networks—Specific Requirements*, Part 11: Wireless LAN Medium Access Control (MAC) and Physical Layer (PHY) Specifications Amendments 6: Mediums Access Control (MAC) Security Enhancements, (Jul. 23, 2004 IEEE Computer Society, LAN/MAN Standards Committee).

Maurer et al., Unconditionally Secure Key Agreement and the Intrinsic Conditonal Information, *IEEE Transactions on Information Theory*, vol. 45, pp. 499-514, (1999).

Cover, T. M. et al., "Network Information Theory," *Elements of Information Theory*, pp. 374-458, (John Wiley & Sons, Inc. 1991) (Internet Publishing Date 2001) downloaded from http://dx.doi.org/10.1002/0471200611.ch14.

Dobbertin et al., RIPEMD-160: A Strengthened Version of RIPEMD, *in Fast Software Encryption LNCS 1039*, pp. 71-82, (D. Gollman, Ed., Springer-Verlag, Apr. 1996).

IEEE 802 Committee, IEEE P802.11r™/D0.01, Jun. 2005 (Draft Amendment to IEEE Std 802.11™, 2005 (based on 802.1ma D1.0), 802.11e™-2005, 802.11k-????), *Draft Amendment to Standard for Information Technology—Telecommunications and information exchange between systems—LAN/MAN—Specific Requirements*, Part 11: Wireless Medium Access Control (MAC) and Physical Layer (PHY) Specifications Amendment 8: Fast BSS Transition, (2005 IEEE Computer Society, IEEE 802 Committee).

IEEE 802 Committee, IEEE P802.11r™/D1.0, Nov. 2005 (Draft Amendment to IEEE Std 802.11™, 2005 (based on 802.1ma D4.0), 802.11e™-2005, 802.11k-D3.0), *Draft Amendment to Standard for Information Technology—Telecommunications and information exchange between systems—LAN/MAN—Specific Requirements*. Part 11: Wireless Medium Access Control (MAC) and Physical Layer (PHY) Specifications, Amendment 2: Fast BSS Transition, (2005 IEEE Computer Society, IEEE 802 Committee).

IEEE LAN/MAN Standards Committee, ANSI/IEEE Std 802.11, 1999 Edition (R2003), *Information Technology—Telecommunications and information exchange between systems—Local and metropolitan area networks—Specific Requirements*. Part 11: Wireless LAN Medium Access Control (MAC) and Physical Layer (PHY) Specifications (Reaffirmed Jun. 12, 2003, IEEE Computer Society, LAN/MAN Standards Committee).

IEEE LAN/MAN Standards Committee, IEEE STD 802.11i™-2004 (Amendment to IEEE Std 802.11™, 1999 Edition (Reaff 2003)), *IEEE Standard for Information Technology—Telecommunications and information exchange between systems—Local and metropolitan area networks—Specific Requirements*, Part 11: Wireless LAN Medium Access Control (MAC) and Physical Layer (PHY) Specifications Amendment 6: Medium Access Control (MAC) Security Enhancements, (Jul. 23, 2004 IEEE Computer Society, LAN/MAN Standards Committee).

IEEE LAN/MAN Standards Committee, IEEE Std 802.1X™-2004 (Revision of IEEE Std 802-1x-2001). *IEEE Standard for Local Metropolitan Area Networks*, Port-Based Network Access Control, (Dec. 13, 2004, IEEE Computer Society, LAN/MAN Standards Committee).

Maurer et al., Information-Theoretic Key Agreement: From Weak to Strong Secrecy for Free. In *Advances in Cryptology-EUROCRYPT 2000*, vol. 1807 of *Lecture Notes in Computer Science*, pp. 351-368. (B. Preneel, editor, Springer-Verlag, 2000).

Maurer et al., Unconditionally Secure Key Agreement and the Intrinsic Conditional Information, *IEEE Transactions on Information Theory*, vol. 45, pp. 499-514 (1999).

Maurer et al., Secret-Key Agreement over Unauthenicated Public Channels—Part I: Definitions and a Completeness Result, *IEEE Transactions on Information Theory*, vol. 49, No. 4, pp. 822-831 (2003).

Nist, Specification for the Advances Encryption Standard (AES). *Federal Information Processing Standards Publication* (FIPS PUB) 197, (Nov. 26, 2001, U.S. Department of Commerce/N.I.S.T.).

Rivest, R. L., The MD4 Message-Digest Algorithm, *Request for Comments (RFC) 1320*, Internet Activities Board, Internet Privacy Task Force (Apr. 1992).

Rivest, R. L., The MD5 Message-Digest Algorithm, *Request for Comments (RFC) 1321*, Internet Activities Board, Internet Privacy Task Force, (Apr. 1992).

Ahlswede et al., Common Randomness in Information Theory and Cryptography-Part I: Secret Sharing, *IEEE Transactions on Information Theory*, vol. 39, No. 4, pp. 1121-1132 (Jul. 1993).

Burrows-Wheeler Transformation / Block Sorting (BWT) at http://www.data-compression.info/Algorithms/BWT/index.htm, downloaded May 16, 2007.

Carter et al., Universal Classes of Hash Functions. *Journal of Computer and System Sciences*, vol. 18, No. 2, pp. 143-154, (Apr. 1979).

Cover T. M. et al., "Network Information Theory," *Elements of Information Theory*, pp. 374-458, (John Wiley & Sons, Inc. 1991) (Internet Publishing Date 2001) downloaded from http://dx.doi.org/10.1002/0471200611.ch4.

Csiszár et al., Common Randomness and Secret Key Generation with a Helper, *IEEE Transactions on Information Theory*, vol. 46, No. 2, pp. 344-366 (Mar. 2000).

Csiszár et al., Secrecy Capacities for Multiple Terminals, *IEEE Transactions on Information Theory*, vol. 50, No. 12, pp. 3047-3061, (Dec. 2004).

Dobbertin et al., RIPEMD-160: A Strengthened Version of RIPEMD, *in Fast Software Encryption, LNCS 1039*, pp. 71-82, (D. Gollman, Ed., Springer-Verlag, Apr. 1996).

IEEE 802 Committee, IEEE P803.11r™/D0.01, Jun. 2005 (Draft Amendment to IEEE Std 802.11™, 2005 (based on 802.1ma D1.0), 802.11e™-2005, 802.11k-????), *Draft Amendment to Standard for Information Technology—Telecommuncations and information exchange between systems—LAN/MAN—Specific Requirements*, Part 11: Wireless Medium Access Control (MAC) and Physical Layer (PHY) Specifications Amendment 8: Fast BSS Transitions, (2005 IEEE Computer Society, IEEE 802 Committee).

IEEE 802 Committee, IEEE P802.11r™/D1.0, Nov. 2005 (Draft Amendment to IEEE Std 802.11™, 2005 (based on 802.1ma D4.0) 802.11e™-2005, 802.11k-D3.0), *Draft Amendment to Standard for Information Technology—Telecommunications and information exchange between systems—LAN/MAN—Specific Requirements*, Part 11: Wireless Medium Access Control (MAC) and Physical Layer (PHY) Specifications, Amendment 2: Fast BSS Transition, (2005 IEEE Computer Society, IEEE 802 Committee).

IEEE LAN/MAN Standards Committee, ANSI/IEEE Std. 802.11, 1999 Edition (R2003), *Information Technology—Telecommunications and information exchange between systems—Local and metropolitan are networks—Specific Requirements*, Part 11: Wireless LAN Medium Access Control (MAC) and Physical Layer (PHY) Specifications (Reaffirmed Jun. 12, 2003, IEEE Computer Society, LAN/MAN Standards Committee).

IEEE LAN/MAN Standards Committee, IEEE STD (802.11i™-2004 (Amendment to IEEE Std 802.22™, 1999 Edition (Reaff 2003)), *IEEE Standard for Information Technology—Telecommunications and information exchange between systems—Local and metropolitan area networks—Specific Requirements*, Part 11: Wireless LAN Medium Access Control (MAC) and Physical Layer (PHY) Specifications Amendments 6: Medium Access Control (MAC) Security Enhancements, (Jul. 23, 2004 IEEE Computer Society, LAN/MAN Standards Committee).

IEEE LAN/MAN Standards Committee, IEEE Std 802.1X™-2004 (Revision of IEEE Std 802-1x-2001). *IEEE Standard for Local and Metropolitan Area Networks*, Port-Based Network Access Control, (Dec. 13, 2004, IEEE Computer Society, LAN/MAN Standards Committee).

Liveris et al., Compression of Binary Sources With Side Information at The Decoder Using LDPC Codes, *IEEE Communications Letters*, vol. 6, No. 10, pp. 440-442, (Oct. 2002).

Maurer et al., Information-Theoretic Key Agreement: From Weak to Strong Secrecy for Free. *In Advances in Cryptology-EUROCRYPT 2000*, vol. 1807 of *Lecture Notes in Computer Science*, pp. 351-368. (B. Preneel, editor, Springer Verlag, 2000).

Maurer et al., Unconditionally Secure Key Agreement and the Intrinsic Conditional Informaton, *IEEE Transactions on Information Theory*, vol. 45, pp. 499-514, (1999).

Maurer et al., Secret-Key Agreement over Unauthenticated Public Channels—Part I: Definitions and a Completeness Result, *IEEE Transactions on Information Theory*, vol. 49, No. 4, pp. 822-831 (2003).

Maurer, Ueli M., Secret Key Agreement by Public Discussion from Common Information, *IEEE Transactions on Information Theory*, vol. 39, pp. 733-742, (1993).

Nist, Secure Hash Standard, *Federal Information Processing Standards Publication (FIPS PUB) 180-1*, US Department of Commerce, Washington, D.C. (Apr. 1995).

Nist, Specification for the Advanced Encryption Standard (AES). *Federal Information Processing Standards Publication* (FIPS PUB) 197, (Nov. 26, 2001, U.S. Department of Commerce/N.I.S.T.).

Omar et al., A Study on Hash Functions for Cryptography. A Study on Hash Functions for Cryptography (Research Index) Sans Institute 2003.

Pradhan et al., Distributed Source Coding Using Syndromes (DISCUS) Design and Construction, In the Proceedings of the 1999 IEEE Data Compression Symposium, DCC'99, (Snowbird Utah, Mar. 1999).

Rabin, M., Digitalized Signatures and Public-Key Functions as Intractable as Factorization, Massachusetts Institute of Technology, Laboratory for Computer Science, Technical Report MIT/LCS/TR-212, (Jan. 1979).

Rivest, R. L., The MD4 Message-Digest Algorithm, *Request for Comments (RFC) 1320*, Internet Activities Board, Internet Privacy Task Force, (Apr. 1992).

Rivest, R. L., The MD5 Message-Digest Algorithm, *Request for Comments (RFC) 1321*, Internet Activities Board, Internet Privacy Task Force (Apr. 1992).

Wang et al., Collisions for Hash Functions MD4, MD5, HAVAL-128 and RIPEMD. *Cryptology ePrint Archive, Report 2004/199*, (revised Aug. 17, 2004).

Ye, Chunxuan, Information Theoretic Generation of Multiple Secret Keys (2005) pp. 97-102. (Ph.D Dissertation, University of Maryland).

Zheng et al., HAVAL—A One-Way Hashing Algorithm with Variable Length of Output, AUSCRYPT'92, (Gold Coast, Dec. 1992).

Kitaura et al., "A Scheme of Secret Key Agreement Based on the Channel Characteristics in OFDM Land Mobile Radio", The IEICE (The Institute of Electronics, Information and Communication Engineers), Transactions on Fundamentals of Electronics, Communications and Computer Science, Oct. 2004, J87-A(10), 1320-1328.

Japanese Application No. 2007-553138: Office Action dated Aug. 20, 2010, 22 pages.

Japanese Application No. 2007-553207: Office Action dated Aug. 27, 2010, 9 pages.

Korean Application No. 10-2007-7018125: Notice of Decision for Patent dated Oct. 22, 2010, 4 pages.

Hersey, J E et al., "Unconventional Cryptographic Keying Variable Management;" IEEE Transactions on Communications, IEEE Service Center, Piscataway, New Jersey, USA, vol. 43, No. 1, Jan. 1, 1995, pp. 3-06, XP000487370, ISSN: 0090-6778, DOI: DOI:10,1109/26.385951.

Koorapaty, Havish et al; "Secure Information Transmission for Mobile Radio," IEEE Communications Letters, IEEE Service Center, Piscataway, New Jersey USA, vol. 4, No. 2, Feb. 1, 2000, XP011010169, ISSN: 1089-7798.

\* cited by examiner

GENERATION OF PERFECTLY SECRET KEYS IN WIRELESS COMMUNICATION NETWORKS

CROSS REFERENCE TO RELATED APPLICATION(S)

This application is a non-provisional of U.S. provisional application No. 60/647,482 filed Jan. 27, 2005, which is incorporated by reference as if fully set forth.

FIELD OF INVENTION

The invention relates to the area of wireless communications security. Specifically, the invention relates to the generation of secret keys based on wireless channel reciprocity.

BACKGROUND

Although many of the traditional cryptographic techniques may be applicable to wireless communications, these techniques suffer from the problem that the legitimate parties rely on the computational difficulty of obtaining a key by an eavesdropper, as opposed to its mathematical impossibility. As computational power available for eavesdropper increases, the effectiveness of such methods decreases. Additionally, such methods suffer from a problem that it is usually a simple matter to verify whether a particular guess is correct. Thus, it would be advantageous to construct a cryptographic technique that provides absolute (unconditional) secrecy, rather than one based on computational assumptions. One method for doing so has been well-known in prior art literature based on work of Maurer, Csiszar and Ahlswede and others. A brief description of the approach follows.

Suppose that two parties, Alice and Bob, have access to two sources of randomness, X and Y, which generate independent samples $X_i$ and $Y_i$, at predetermined times indexed by i. Suppose that Alice and Bob wish to generate a "perfectly secret" key by communicating over a public channel to which eavesdropper, Eve, has access. Moreover, Eve may also have access to another source of randomness, Z, generating independent samples $Z_i$. The random source Z is presumably dependent on the random sources X and Y, but not as strongly as X and Y are cross-dependent on each other. Thus, intuitively, Alice and Bob share some advantage over Eve through the stronger inter-dependence of their random sources. Indeed it has been shown that Alice and Bob can exploit this dependence to generate a "perfectly secret" random key.

Without loss of generality, keys can be defined as bit sequences. A perfectly secret random key of length N bits is an N-bit sequence S, shared by Alice and Bob, such that anyone helse's (in our case there is only Eve) estimation about what this key sequence can be is roughly equiprobably distributed over all possible N-bit sequences, of which there are $2^N$.

Let V denote all the communication which takes place over the public channel; n be the number of time instances over which each of the three parties accumulate the output of the random sources they have access to; |S| be the length of the resulting key. Then for any $\epsilon > 0$, we seek a protocol such that for sufficiently large n, the following relationship holds:

$$\frac{1}{n}H(S|V,Z) > \frac{|S|}{n} - \varepsilon \qquad \text{Equation 1}$$

where H is the entropy of a random variable, well known from prior art literature on information theory. Note that Equation 1 is normalized to a single sampling of the random sources as this is the basic resource for key generation.

The quantity $$\frac{1}{n}H(S|V,Z),$$

which by equation 1 can be equivalently thought of as [|S|/n], is called the secret key rate. Hereafter, the notion of length of secret key and the secret key rate are interchangeable, as appropriate by the context. Namely, whenever a length of a particular secret key is noted, it is to be understood that this is derived based on the observation of some specific quantity (n) of the underlying random variables. Whereas, a secret key rate is noted, the notion is one of the average number of secret key bits per random variable observation.

It is worth noting that there is a critical difference between the above definition of secrecy and the one that most modern crypto systems, including all public-key systems, rely on. Specifically, modern crypto systems rely on the fact that it may be extremely difficult from a computational complexity point of view to guess the crypto key. However, in most of these systems, once the correct guess is produced it is very easy to verify that this is indeed the correct guess. In fact, the work of Maurer and Wolf implies that this must be so for any public-key system, i.e. one where the encryption key is made public, while the decryption key is kept secret. To illustrate the point, consider the following simple example of what a public-key crypto system might be based on, while keeping in mind that most practical systems are much more sophisticated.

Let p and q be two large prime number and let s=pq. It is known that the problem of factoring a product of two large prime numbers is computationally difficult. Thus, one might envision that a public-key cryptography system may be constructed by having the communication destination choose p and q in secret and make their product s publicly available, which is then used as an encryption key for some encryption system which cannot be easily decrypted unless p and q are known. An eavesdropper wishing to intercept an encrypted message would likely start by attempting to factor s, which is known to be computationally difficult. Presumably the eavesdropper would either give up or so much time would pass that the secrecy of the message will no longer be an issue. Note however, that should the eavesdropper guess p, it will quite easily verify that it has the right answer. This ability to know the right answer once it is finally guessed, is what separates computational secrecy from "perfect secrecy". Perfect secrecy means that even if the eavesdropper guesses the key correctly, it will have no ability to determine that it has indeed done so. Thus "perfect secrecy" is, in a very specific sense, a stronger notion of secrecy than what is prevalent in modern cryptography systems.

It is not obvious that such a protocol generating perfect secrecy in our scenario should exist. Nevertheless its existence, or the existence of many different protocols, has been established in the works of Ahlswede and Csiszar, Csiszar and Narayan and Maurer and Wolf. These prior works also give various upper and lower bounds on the number of random bits that can be generated per single sampling of the random sources under a wide range of assumptions.

The process for generating a perfectly secret key may then be outlined as follows. Alice and Bob first start by utilizing their joint randomness to establish a bit-string sequence S' of whose inherent entropy from Eve's point of view is |S| bits with |S|≦|S'|. This is done using some number of public exchanges between Alice and Bob. In many cases, a single unilateral exchange is sufficient. The exact nature of the exchange depends on the nature of the jointly-random sources (X,Y,Z). This step is usually called information reconciliation.

Alice and Bob then possibly use another set of public exchanges, a single exchange is typically sufficient, to publicly agree on a function which transforms the sequence S' into a perfectly secret string S. This is typically called privacy amplification. Alternatively, this function may be pre-agreed upon during the system design. In this case, it is assumed that Eve is aware of this.

An additional step occurring before the first step described above called advantage distillation may further be utilized, however as it is not pertinent here, nothing further is described in regards to it.

As specifically applied to a wireless communication system, the process needs further specification. While correlated random sources are a priori difficult to produce without prior communication, the wireless channel provides just such a resource in the form of the channel impulse response. Specifically, in certain communications systems, two communicating parties (Alice and Bob) will measure very similar channel impulse responses when communicating from Alice to Bob and from Bob to Alice (e.g., Wideband Code Division Multiple Access (WCDMA) Time Division Duplex (TDD) systems have this property). On the other hand any party not physically co-located with Alice and Bob is likely to observe a channel impulse response (CIR) that has very little correlation with that of Alice and Bob. This difference can be exploited for generation of perfectly secret keys. Also, it would be of interest to generate some number of perfectly secret bits per CIR measurement. Note that the CIR measurements have to be spaced fairly widely in time so as to be more or less independent.

Thus, there exists a need to design a system which explicitly extracts the secret bit string from a reciprocal wireless channel, while facing the challenge that under the worst case assumption applied in cryptography, an eavesdropper can intercept any bit exchanged between two wireless terminals, and is aware of the algorithm used by the two terminals to derive a secret key.

Yet another issue is that one may desire to extend the generation of a perfectly secret key from two transceiver terminals to a plurality of transceivers, such that the entire network of transceivers shares a common perfectly secret key, while only each pair shares the inherently unique channel properties. That is, each pair of transceivers generates a common random key, but these keys are different from pair to pair. This makes sharing information in such a network quite inefficient when the same information is to be broadcast to more then one receiver. The reason is that the message is encrypted with a different key for each receiver and thereafter appears as a different message and thus must be communicated separately to each receiver. In contrast, a message encrypted with a shared key can be multicast once and all of the legitimate receivers are able to decrypt the single transmission.

SUMMARY

This invention is a method and system for generating a perfectly random secret key between a plurality of terminals in a wireless communication network, such that it is mathematically impossible for an eavesdropper to derive or guess the key used with any amount of certainty. The invention utilizes the unique randomness that is inherent in point-to-point wireless channels. An eavesdropper may guess the right key, but it has no way of distinguishing it from the wrong keys.

Between a pair of transceivers, a lead transceiver derives a CIR estimate of the shared channel, which is then discretely processed to produce a long secret key. An error correction code is generated and the parity bits are transmitted to the second transceiver. An optional synchronization bit string is also generated and transmitted to the second transceiver, for assuring synchronized CIR estimation at the second transceiver. The second transceiver independently derives its CIR estimate of the shared channel and processes its CIR estimate with the received parity bits and synchronization codes sent by the lead transceiver. The result is an identical long secret key as that derived at the lead transceiver, without having publicly shared the key except for the parity bits. To remove correlation and secrecy lost by the parity bits exchanged, each transceiver further processes its long secret key by a privacy amplification process.

This technique for perfectly secret key establishment is also extended to a general network setting for three or more transceivers to share a single perfectly secret key.

BRIEF DESCRIPTION OF THE DRAWING(S)

A more detailed understanding of the invention may be had from the following description of a preferred embodiment, given by way of example, and to be understood in conjunction with the accompanying drawings wherein.

DETAILED DESCRIPTION OF THE PREFERRED EMBODIMENT(S)

Although the features and elements of the present invention are described in the preferred embodiments in particular combinations, each feature or element can be used alone (without the other features and elements of the preferred embodiments) or in various combinations with or without other features and elements of the present invention.

Hereafter, a transceiver includes but is not limited to a wireless transmit/receive unit (WTRU), network node, user equipment, mobile station, fixed or mobile subscriber unit, pager, or any other type of device capable of operating in a wireless environment. When referred to hereafter, a base station includes but is not limited to a Node-B, site controller, access point or any other type of interfacing device in a wireless environment.

Figure 1:
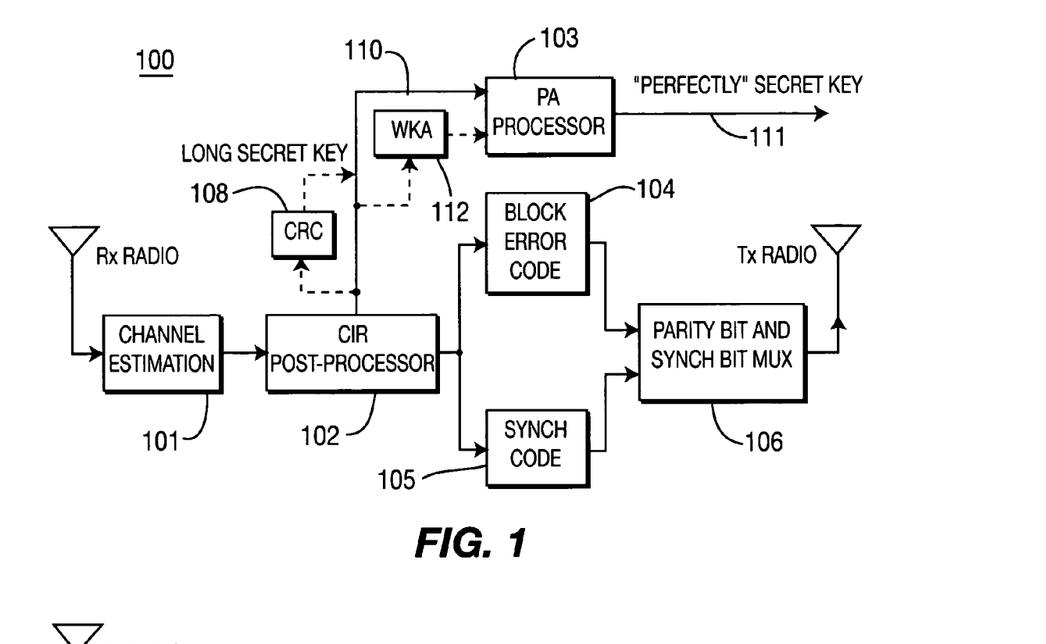
FIG. 1 show a block diagram of secrecy processing in transceiver A, the lead transceiver.
Figure 2:
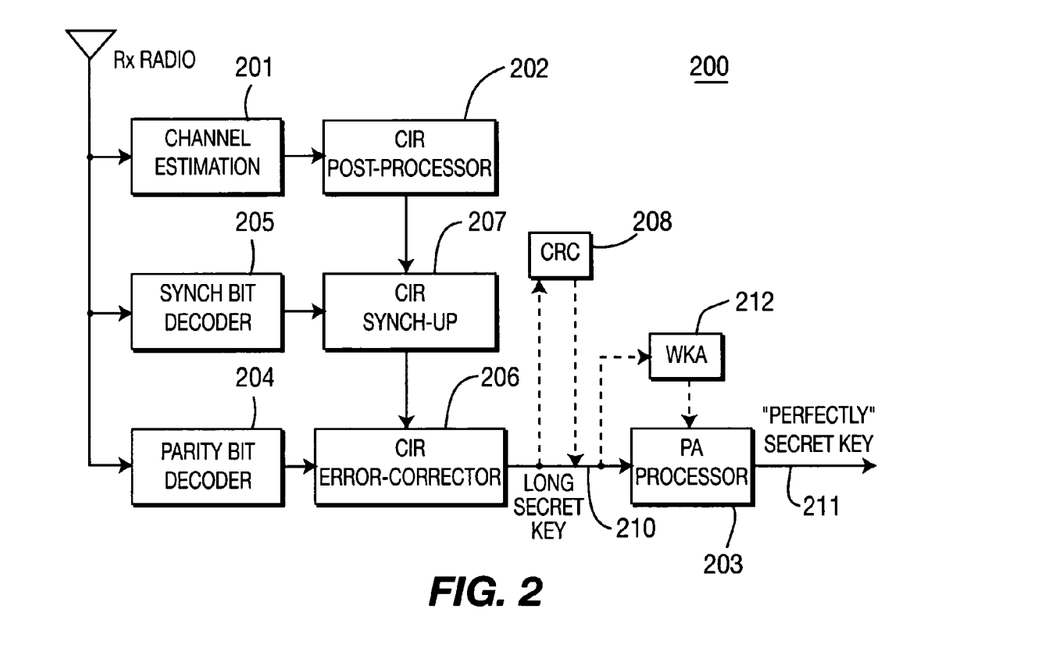
FIG. 2 shows a block diagram of secrecy processing in transceiver B.

FIGS. 1 and 2 show block diagrams of transceivers 100 and 200, respectively, which represent two legitimate parties communicating in a point-to-point system. The present invention establishes a perfectly secret key between two transceivers 100 and 200, where transceiver 100 is selected to be the lead transceiver (i.e., transceiver 100 takes the lead in the key establishment process). Note that transceivers 100 and 200 are preferably sub-components of a larger communication system and/or application specific integrated circuits (ASICs). Some or all of the processing elements shown in FIGS. 1 and 2 may be shared for other, non-secrecy-related tasks.

In general terms, transceivers 100 and 200 follow the following initial procedure steps for generating a perfect secret for encrypted communications:

1) Each transceiver mutually transmits to each other either a specially designed signal (e.g., a comb of tones) or a pilot sequence which may also be used for other purposes.
2) The wireless physical channel naturally modifies the sequences somewhat according to the physical environment, creating signal fading and distortions, but due to channel reciprocity these modifications are highly similar. Accordingly, transceivers 100 and 200 utilize the joint randomness inherent in their shared channel to establish secret keys.
3) Each transceiver then transforms its received signal into binary (or some other discrete form) sequences in some fashion.

As shown in FIG. 1, the lead transceiver 100 comprises a channel estimator 101, a channel impulse response (CIR) post processor 102, a privacy amplification (PA) processor 103, a block code encoder 104, an optional synch code unit 105, a parity bit and synch bit multiplexer (MUX) 106, and an optional weak-key analysis processor 112.

At transceiver 100, the channel estimator 101 estimates a channel impulse response (CIR) from a received radio signal from transceiver 200, which is then processed by the CIR post processor 102. The primary task of the CIR post-processor is to convert the estimated CIR into a bit-string hereafter known as the long secret key 110. Transceiver 100 assumes that at the completion of the information reconciliation process, transceiver 200 will be in possession of the same bit string, shown as long secret key 210. This long secret key 110, 210 is not perfectly secret for the following two reasons: 1) because the CIR samples are potentially correlated (highly correlated for high sampling rates), the bits are not independently distributed; 2) because certain parts of the protocol required public communications, some of the information has been leaked to a potential eavesdropper. Privacy amplification (PA) processor (103) compensates for these problems.

As part of the information reconciliation process, the block code encoder 104 derives a block code with parity bits for error correction at transceiver 200. In at least one preferred embodiment, the synch code encoder 105 produces a code used for synchronizing the CIR estimates between transceiver 100 and 200. The parity bits and synch code bits are multiplexed by the MUX 106 for transmission to transceiver 200.

An optional weak-key analysis processor 112 detects and rejects long secret key 110 if determined to be a weak long secret key.

As shown in FIG. 2, transceiver 200 comprises a channel estimator 201, a CIR post-processor 202, a privacy amplification processor 203, a synch bit decoder 204, a parity bit decoder 209, a synch-up CIR unit 205, and a weak-key analysis processor 212.

At transceiver 200, channel estimator 201 receives the radio signal from transceiver 100 and estimates the CIR. The CIR post processor 202 filters the CIR estimates. These two units operate in an identical manner to the corresponding devices 101 and 102 on transceiver 100. The output of the CIR post-processor 202 is a "random secret key" bit string. Ideally, this string is identical to the long secret key on transceiver 100 based on the channel reciprocity that exists between the two transceivers. However, the actual CIR estimates are not identical due to CIR distortion, channel noise, and different channel estimation starting points; the two strings are in fact somewhat different.

If the actual output of CIR post processor 202 was identical to that of CIR post processor 102, then privacy amplification by PA processor 203 and optional weak-key analysis could be applied to generate a perfectly secret key identical to that at transceiver 100. The nature of PA processor 203 is the same as that of the PA processor 103 and the WKA processor 212 is the same as the WKA processor 112. However, because the output of CIR post processor 202 is not the same as that of CIR post processor 102, PA processing and WKA processing cannot be applied directly to it. Rather, transceiver 200 uses the parity and synch bits transmitted by transceiver 100 to correct the differences.

In an embodiment where the synch code encoder 105 is implemented, the synch bit decoder 205 and parity bit decoder 204 decode the synch bits and parity bits from the received signal. The CIR synch up unit 207 processes the decoded synch bits and synchronizes the CIR estimate with the CIR estimate of transceiver 100. The parity bit decoder 204 processes the decoded parity bits and performs error correction on the synchronized CIR estimates. The long secret key 210 has now been recovered as it exists at transceiver 100 and the PA and WKA processing can be applied. The long secret key 210 embedded within the received radio signal from transceiver 100 is processed by a PA processor 203 to provide the perfectly secret key. The optional weak-key analysis processor 212 detects and rejects weak long secret keys.

A description of the perfectly secret key generation from the channel estimation now follows. Both transceivers 100 and 200 derive an estimate of the CIR based on the received radio signal at channel estimation units 101 and 201. Both transceivers must support this operation through the transmission of some kind of a radio signal. Typically, this is a specifically designed pilot signal, used for channel estimation, for purposes other than secret key generation. Most modern systems embed it for the purpose of data estimation. There are a number of methods for performing this step, including, but not limited to, the transmission of special signaling by both transceivers for the purposes of aiding this process at the other transceiver. The implementation of such signaling can include using a midamble, such as used in the Time Division Duplex (TDD), a continuous pilot such as in IS-95 and FDD systems, embedded pilots at certain frequencies, such as in many OFDM systems.

The output of the channel estimation units 101 and 201 is a digitized representation of the CIR. The CIR estimates may be produced and stored in a number of different ways, including time domain, frequency domain, and use of an abstract vector space, so long as the representation technique in both transceivers 100 and 200 is identical. In the preferred embodiment, the CIR estimates at the output of the CIR estimators 101, 201 provide an amplitude/profile output for generation of the secret key, while ignoring the CIR phase information. Alternatively, the CIR phase information of the channel estimate may also be used in the process. Depending on the implementation, only partial information about the CIR may be reciprocal and therefore suitable for generation of common secrecy.

A common problem in producing the CIR from a digital signal is that differences in the sampling phases of the A/D converters may result in CIR estimates that appear drastically different. This is particularly an issue if the CIR is stored in the time domain. It is not a significant issue if the CIR is stored in the frequency domain. The degree to which this is a problem with other alternative storage methods will vary. A simple method to address this problem is to sample the analog signal at the antenna at a rate which is significantly higher than the minimum rate (i.e., the Nyquist rate) given the transmission bandwidth. A rate which is a factor of 4 to 10 times the Nyquist rate may already be considered significantly higher.

CIR post-processors 102 and 202 perform post processing on the resulting CIR estimate with a low-pass filter and possibly an interpolating filter. Additional post-processing maybe required in the case where the transceivers are MIMO equipped, as differences in the number of antennas and antenna patterns may cause the CIR estimates to differ. In such cases, the transceivers 100 and 200 may have to exchange information about their antenna configurations which would then allow them to derive symmetric CIR estimates from their observations.

Because of the channel reciprocity between transceivers 100 and 200, the post-processed CIR estimates produced at the transceivers are expected to be very similar. However, differences between the CIR estimates may be introduced at the transceivers 100 and 200 by any of the following three error sources.

A first error source stems from the channel reciprocity presuming simultaneous channel estimation at both transceivers 100 and 200. Differences in this simultaneity will result in some difference in channel estimates.

Figure 3:
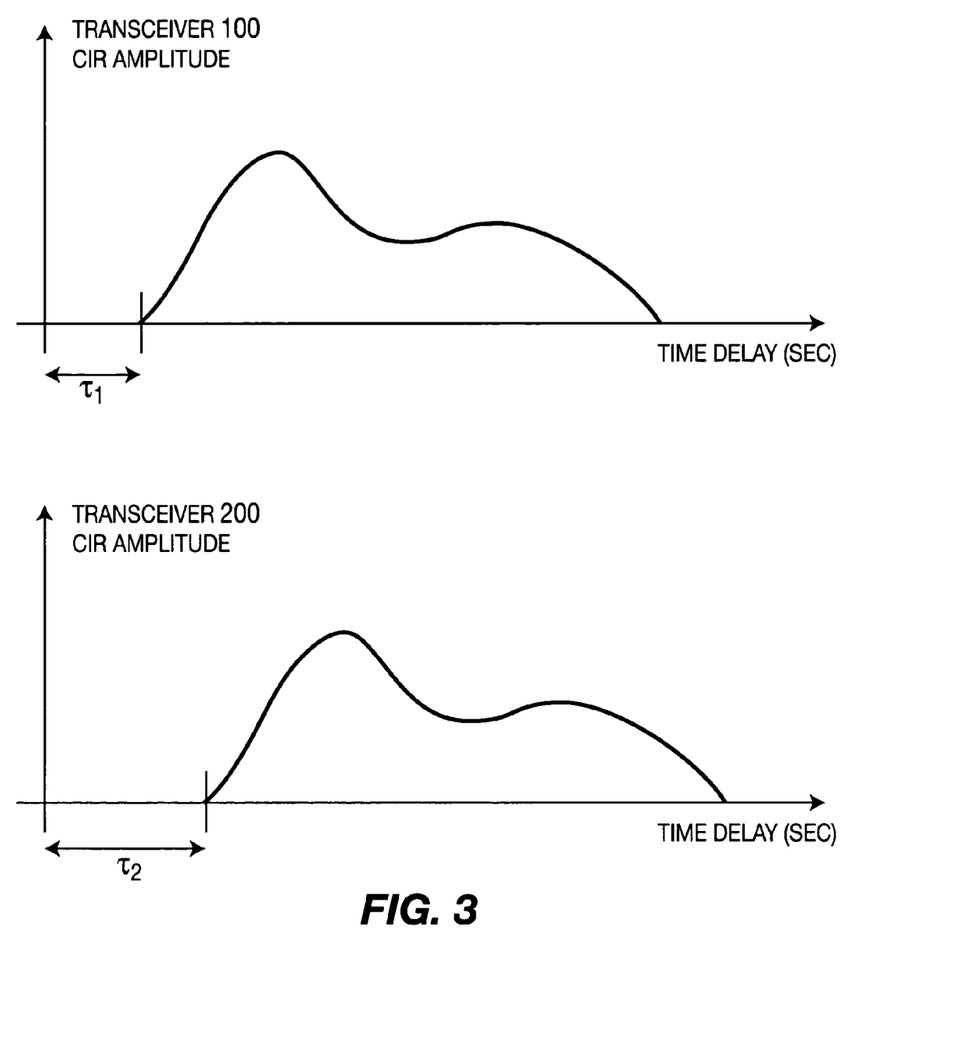
FIG. 3 shows an illustration of the synchronization problem in the time-delay domain.

A second error source is that the digitized CIR estimates may need to be synchronized with respect to the starting point. For example, if the estimate is digitized in the time-delay domain, the start of the meaningful portion of the CIR may occur at a different place with respect to the reference zero-time in the two transceivers 100 and 200. As shown in FIG. 3, transceiver 100 has a starting point with time delay $\tau_1$ from the reference zero-time, while transceiver 200 has a starting point with time delay $\tau_2$ from the reference zero-time, where $\tau_1 \neq \tau_2$. As another example, if the CIR is stored using frequency domain representation, a different starting frequency/reference phase may be assumed in determining the storage parameters.

A third error source is that the CIR estimates will differ due to errors caused by interference inherent in any wireless channel. This interference may be due to other devices operating in the same frequency band and/or receiver noise, and/or environmental noise, such as thermal noise.

Ensuring simultaneity in channel estimation at transceivers 100 and 200 can be accomplished by using several means which currently exist in most communication systems. One such means is to have the channel estimation timing tied to a specific system time, such as a radio frame or slot boundary and the super frame counter in a UMTS system. Another means is by embedding a synchronization signal in the pilot signal that the transceivers emit to support channel estimation. Alternatively, a synchronization event maybe derived from such pilot signal without requiring embedding of a special signal. A third way to ensure simultaneity is by having the channel estimation events tied to an absolute time reference to which both transceivers have access, including the global positioning system (GPS) satellites or a common system time used by wireless communication systems. A fourth possible means for ensuring simultaneity is measuring the roundtrip delay using pre-defined techniques and then basing synchronization on this delay.

While a small synchronization difference may still exist after such methods are used, these are, in all likelihood, too small to have any significant impact on system performance. Any small residual number of discrepancies remaining can be dealt with by the same mechanisms that address discrepancies due to interference in the wireless channel, such as block codes and CRC codes, which will be described later.

The starting point synchronization for the stored CIR may be handled by recording the starting point at transceiver 100 and transmitted to transceiver 200 using a high-reliability code to ensure error-free transmission. Alternatively, a special synchronization code from several well-known families of such codes (e.g. comma-free codes) may be used. Since the synch problem is typically limited to just a few samples, only a limited performance from such a special synchronization code is necessary. Synch code encoder 105 in combination with sync bit decoder 205 and CIR sync up unit 207 implement these solutions for starting point synchronization for the stored CIR. Decoder 205 decodes the sync bits when they are sent using a separate code, while CIR sync up unit 207 adjusts the position of the CIR relative to a local reference in accordance with the synch bits. Alternatively, the block code used to correct interference errors may be utilized in conjunction with the two methods above or exclusively, as described below. Yet another alternative is to use a CIR post-processing method which is not sensitive to this starting point synchronizing problem.

The starting point synchronization may also be addressed without resorting to the coding of the timing information. One such method includes having the transceivers 100 and 200 generate a special synch signal related to a common timing source (e.g., GPS), and the CIR estimation may be made with respect to such a signal. Alternatively, the starting point synchronization can be achieved by processing the CIR in a domain where it is not an issue. However, such an approach requires sacrificing some secrecy rate. For example, provided that the CIR phase information is ignored according to the preferred embodiment, the sync problem is not present in the frequency domain. Depending on the interference level of the channel, the secrecy rate loss may be large or minimal. As another example, in a very noisy channel, the phase information may be highly unreliable, thus ignoring it would cause minimal secrecy rate loss.

Block code encoder 104 provides systematic error correction codes, in the form of parity bits, decoded by transceiver 200 at parity bit decoder 204, where discrepancies between transmitted strings and received strings occur due to channel interference. A systematic error correction code is one in which the codeword of the decoder 204 output contains the original message of the encoder 104 input. Here, the systematic error correction code is implemented by encoder 104 residing in the transmitter of the lead transceiver 100, and the parity bit decoder 204 located in the receiver of transceiver 200. Typically, a block code is pre-selected by system designers. Alternatively, it can be dynamically selected based on some real-time criterion, the selection publicly communicated between transceivers 100 and 200. Because privacy amplification is used, the fact that the block code is publicly known does not reduce the system's ability to generate secrecy.

The block code encoder 104 takes the input bits and generates a set of parity check bits, which are to be transmitted without the input bits. The parity bit decoder 204 then combines the parity bits received from the channel with the output of the CIR post-processor 202 to produce a complete "corrupted codeword" and decodes the long secret key 210. The processing of the parity bits completes the decoding operation resulting in the output of the CIR post-processor 202 to be corrected so that it is now identical to the long secret key 110 as it exists in transceiver 100.

According to the present invention, the block code is utilized in an unconventional manner. The CIR estimate at transceiver 100 is used as the input to the block codes, however only the parity bits generated by the encoder 104 are transmitted. Transceiver 200, having received this transmission, possibly with some errors, then treats its own CIR estimate as the message part of the codeword, which also may contain errors, and uses the received parity check bits to correct these errors. Provided that the block code is well chosen, the output of parity bit decoder 204 is identical to the CIR estimate of transceiver 100 with very high probability. Thus, transceivers 100 and 200 have succeeded in obtaining the same string, while publicly revealing only some portion of it, i.e., the transmission of the parity check bits.

In selecting the block code, it is assumed that a potential eavesdropper has the ability to find out what block code is used, thus there is no attempt to keep this secret. The nature of the block code is only important insofar as its error-correcting capability and encoding/decoding complexity must be weighed as design considerations. Any systematic block error correcting code may be used, including Reed-Solomon and turbo codes. The block code size is preferably predetermined since in most systems, a reasonable upper bound can be placed on the length of the CIR. However, if this cannot be done, a specific code from a pre-agreed family of codes is selected using public discussion. Alternatively, a family of block codes is selected, for instance a family having a variable error-correcting capability. From the block code family, the transceivers 100, 200 then select which code to use based on the channel conditions (interference levels, Doppler spread, etc.). Agreement on the block code is established via public communication. Since the block code selected does not have to be kept secret to ensure secrecy, this does not compromise the system.

The secrecy remaining in the resulting strings is roughly equivalent to the initial entropy of the CIR estimates, less the number of parity bits used, less the information that a potential eavesdropper may have regarding the CIR estimates. Assuming that an eavesdropper's knowledge regarding the CIR estimates is small, it is desirable to use as few parity bits as possible for maximum secrecy. On the other hand, a sufficient number of parity bits is required to ensure that transceiver 200 winds up with a digitized sequence closely identical to that at transceiver 100 with a very high probability, where the acceptable probability threshold is predetermined. Thus, the ability to select a block code from a family of codes to meet a particular channel condition may be implemented to maintain the proper balance in this tradeoff. This decision making mechanism is an optional add-on feature to block code encoder 104.

As previously introduced, block codes can also be used to support synchronization of the starting point of the digitized CIR. If transceiver 200 is not certain about the exact starting point either because no synch-up mechanism is used or because it does not completely reduce the uncertainty, it will have this narrowed down to a finite, typically small, set of possibilities. It can then use the received parity bits to attempt decoding with each one of the possible starting points. In doing so, it needs to count the number of "errors" in its own CIR estimate that are corrected by CIR error corrector 206. With very high probability, all positions but the correct one will result in a very high number of corrections; while the correct one results in a very low number of corrections. In this fashion, the block code decoding process can aid or fully support the starting point synchronization process.

Although the utilization of a good error-correction code results in a high likelihood that the same key is generated at both terminals, the process is not guaranteed to succeed. If the procedure fails, the terminals wind up with two different secret strings. Even if these differ by only a single bit, communication is no longer possible. This problem can be mitigated in one of several ways. If the terminals have a way to detect that a decrypted message is incorrect, then the failure of key agreement can be detected in just such a way. However, such a detection process is often either not feasible or too costly in the sense of wasted communication resources. In this case, an alternative method utilizing error-detection coding may be applied.

A common type of error-detection coding is CRC coding, which is described in the following example as the preferred choice for error-detection coding. The CRC processor 108 computes the CRC check bits for the long secret key based on some pre-selected CRC code. The resulting string with the CRC bits is then forwarded to the transceiver 200.

Transceiver 200 then proceeds with block decoding exactly as described above. Following the decoding, the CRC processor 208 computes its own CRC bits using the same CRC code and compares them to the bits received from transceiver 100. If the resulting error corrected string passes the CRC check, success is declared. Otherwise transceiver 200 will declare key generation failure and the key generation process will be repeated.

Finally, when the channel conditions are so good that the CIRs are highly likely to be identical, the block code can be alternatively used for error checking, simply by making sure that in the parity bit decoder 204 at transceiver 200 there are no errors detected.

As an alternative embodiment where a non-systematic error code is utilized, the following example illustrates a syndrome implementation. Suppose that Alice and Bob know two correlated binary independent and identically distributed sequences $X^n=(X_1, \ldots, X_n)$ and $Y^n=(Y_1, \ldots, Y_n)$, respectively. Alice helps Bob recover $X^n$ by transmitting information of $X^n$ to Bob. Note that Alice does not need to transmit all of $X^n$ to Bob, as Bob has already known some information of $X^n$, by means of the correlated sequence $Y^n$. One known solution, known as the Slepian-Wolf bound, suggests that the minimum number of transmission bits from Alice to Bob, which enable Bob to reconstruct $X^n$, is $nH(X|Y)$, with $H(X|Y)$ denoting the conditional entropy. Using syndromes according to the present embodiment, the $nH(X|Y)$ transmission bits can be determined, as well as reconstructing $X^n$, based on $Y^n$ and the transmitted bits. One embodiment where the syndrome-based approach would be important is if low density parity check (LDPC) codes are used for error correction, as LDPC codes are typically non-systematic.

Consider the following simple but illustrative example. Let $X^3=(X_1, X_2, X_3)$ and $Y^3=(Y_1, Y_2, Y_3)$ be two binary sequences (of length n=3), with Hamming distance no more than one. Alice and Bob respectively observe $X^3$ and $Y^3$. Alice helps Bob reconstruct $X^3$ by transmitting partial information of $X^3$. Note that if Bob knows that $X^3$ belongs to the set {000, 111}, he could easily decode $X^3$ since the Hamming distance between $X^3$ and $Y^3$ is no more than one, while the Hamming distance between "000" and "111" is three. Thus, if the Bob's decoder knows that either X=000 or X=111, the uncertainty is resolved by checking for which is closer in Hamming distance. Similarly, the knowledge that $X^3$ belongs in any of the sets {001, 110}, {010, 101} and {100, 011} could help Bob recover $X^3$, as these too have a Hamming distance of three. Hence, Alice only needs to inform Bob to which set (out of the four sets above) $X^3$ belongs.

The four sets above, having the Hamming distance of three for their respective subsets, are called cosets for the linear code {000, 111}, with parity check matrix $$P = \begin{bmatrix} 1 & 0 & 1 \\ 0 & 1 & 1 \end{bmatrix}.$$

The syndrome of a sequence $X^3$ verifies parity checks of the valid codewords and is defined as $P(X^3)^t$, where t denotes transposition. It is known that all sequences in the same coset have the same syndrome, and every two sequences in different cosets have different syndromes. Therefore, Alice could just transmit the syndrome of her observations $X^3$, which indicates the coset containing $X^3$.

Turning now to the PA processors 103, 203 shown in FIGS. 1 and 2, these are responsible for reducing the strings so that the length of the strings in bits is roughly equivalent to the amount of secrecy provided by the key. These are implemented using universal hash functions where the specific function used may be either pre-agreed upon or agreed upon using public communication. The function, like the block code used, does not have to be kept secret and may therefore be agreed upon using the public wireless channel.

Hash functions are transformation functions that take input strings of dimension M, to a smaller dimension N; where M>N:

$$f: \{0,1\}^M \Rightarrow \{0,1\}^N \qquad \text{Equation (5)}$$

Hash functions are commonly used in computer science to solve the dictionary problem. The dictionary problem is defined as the establishment of a mechanism for storing a given set of items (words, names, objects, keys, etc) and their associated attributes, such that the items are subsequently looked up efficiently. Hash functions include attributes such as a lookup operational time cost of a given set and naïve implementations of storing and lookup mechanisms.

Obtaining a lookup operation cost time is a very difficult task because input strings are not typically from a uniform distribution and because of the complex mapping from a larger dimension M, to a smaller dimension N. For these reasons, collisions in outputs of hash functions are not uncommon, where a collision is the result of having more than one input string producing the same output value. Various schemes, such as double hashing, probing (linear and quadratic), chaining, etc. are used to come as close to the lookup operation cost time for these hash functions.

The hash function of the present invention possesses the following properties that are useful in achieving the perfect secret. Firstly, the hash function is one-way irreversible in that it is significantly easier to compute in the forward direction than in the reverse direction. Typically, it takes seconds to compute in the forward direction, whilst it is computational impossible to find the inverse. That is, for a given hash function $y=h(x)$, it is easy to obtain a y value for a given x value, but it is computationally impossible to obtain an x value for a given y value.

Next, the hash function according to the present invention has a weak collision resistance and a strong collision resistance. A weak collision resistance is defined as follows. Given a message x, and its hash value (also referred to as message digest) y, it is computationally impossible to find another message z, such that their hash functions are equivalent, i.e., $h(x)=h(z)$. Note that the user does not have the choice of selecting the message and its hash value but must determine a different message with the same hash value.

A strong collision resistance exists where it is computationally impossible to find two different messages, x and z, with $x \neq z$, such that their hash functions are equivalent, i.e., $h(x)=h(z)$. Since the user can select the messages in this case, the property is referred to as strong collision resistance.

These properties are referenced by most of the standardized hash functions. There are two main standards: Secure hash algorithms (SHA) family and the message digest algorithms (MD) family. Moreover, the SHA-family and MD-family are computationally secure if a potential attacker of the crypto-system does not have the computational resources to break it. The universal hash function is provably secure in the sense that the effort to break such a crypto-system is as difficult as solving any generic hard problem (e.g., factoring of big numbers, calculating square roots in the field of integers modulo a composite, calculation of discrete logarithms on a finite group, etc).

According to the present invention, a universal hash function $g_{(a,b)}^{(x)}$ maps a universe of keys $\{x\}$, each of size M bits, to fixed hash values, each of size N bits, where N<M, such that for each pair of keys, $x_i$, $x_j$, with $x_i \neq x_j$, the number of collisions is small. That is, the number of collisions for which $g(x_i)=g(x_j)$ equals $\frac{1}{2}^N$.

The hash values are derived using a universal hash function, such as the following equation:

$$g_{(a,b)}(x) = ((ax+b) \bmod p) \bmod 2N \qquad \text{Equation (6)}$$

where:
p is a prime number such that $p \geq (2^M - 1)$;
$a = \{1, 2, \ldots, p-1\}$;
$b = \{0, 1, \ldots, p-1\}$.

Considering the range of choices of a and b, there are $p(p-1)$ universal hash values. The set of such functions $G = \{g_{(a,b)}(x)\}$, are collectively referred to as the universal class of hash functions and the number of collisions for which $G(x_i) = G(x_j)$ is at most $|G|/2^N$.

The result of the hash value processing is that the publicly exchanged bits that are assumed to have been intercepted by an eavesdropper have been "hashed out" in that the final perfect secret key includes no bits that were publicly exchanged.

Note that an entropy coder, or a good compression algorithm such as the Burrows-Wheeler Transform, may need to be used in conjunction with PA processing when the long secret key 110, 210 is not uncorrelated. In certain cases, usage of such a coder may also remove the need for a hash-function based PA processing as a much simpler approach may do (e.g., selecting only certain output bits).

Finally, note that in certain cases, hash-function based PA processing is not necessary where a nonsystematic code-based approach is used, as described above regarding error correction, with LDPC coding as an example.

Either prior to or following the PA step, a weak-key analysis (WKA) step may be introduced to further improve the performance of the system. As shown in FIGS. 1 and 2, the WKA processor 112, 212 protects the system against the possibility (albeit unlikely) that the randomly-generated perfectly secret key, has a high probability of intercept according to some extrinsic contextual information. Examples of such keys include a stream of all 1's, all 0's or a sequence within a defined period. The specific criterion would be selected by the system design.

If WKA detects a weak key, the appropriate procedure is to reject the key and repeat the process. If either the block-coding process or the PA process involves real-time communication of the code/hash function to be used, a new code/hash-function can be selected and the process repeated with the same CIR. This will reduce the secret-key rate; otherwise the terminals have to wait until a new CIR is available. The reduction of the secret-key rate should be reported.

A major feature of the approach outlined above is the fact that random sequences are generated in large blocks. These blocks cannot be updated frequently because one would have to wait until the CIR is almost entirely uncorrelated with the previous one. However, in certain situations one desires much more frequent updates of a small number of secret bits. For example, one may want to have a "black box" which shared the output secret bits one at a time on a frequent basis. One way to achieve this is to take the generated block of secret bits and to output them one at a time. Another way is to modify the process described above in order to continually generate a small amount of secret bits. This may be done as follows. The high-level block diagrams in FIGS. 1 and 2 still apply. However, the channel estimation unit 101, 201 now produces frequent estimates of the channel and the CIR post-processor 102, 202 generates a difference vector between the current and the previous estimate.

The difference vector may be generated in a number of different ways. The simplest is to simply take the difference between the two consecutive representations of the CIR. However, this is usually not the most effective method for doing this. Better alternatives include continual filtering the CIRs with a good prediction filter, such as a Kalman prediction filter, and taking the difference between the predicted and the actually observed value. Other variations on these approaches maybe used.

Note here that taking differences is practical when the CIRs are correlated from one measurement to the next and hence taking the difference removes redundancy. Another approach would be to take independent samples of the channel at some frequency which ensures lack of correlation and then taking a first-in-first-out (FIFO) approach to the estimates and then communicating new values at some interval to allow for continuous update and change of the key. The key objective here is to transmit minimal information over a given time to enable a new independent key to be generated at a desirable frequency.

The difference vector is likely to be small and thus block coding this should not be very effective. However, one may view the sequence of difference vectors as an information stream. Encoding of information streams is performed effectively by convolutional codes and therefore a systematic convolutional code is proposed as a replacement for the systematic block code as described above.

Figure 4:
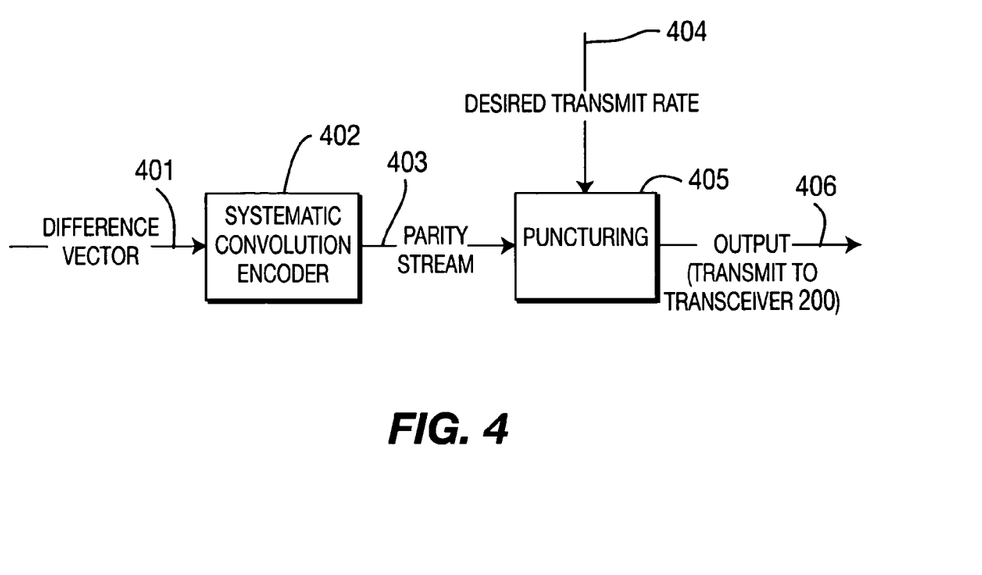
FIG. 4 shows a difference vector encoding using a convolutional code.

FIG. 4 shows a block diagram of such an encoder, which resides in the lead transceiver 100, replacing the block code encoder 104 shown in FIG. 1. A difference vector stream 401 is provided to a standard convolutional encoder 402 (typically a shift register with XOR gates) which generates one or several parallel parity streams 403 (one is shown for simplicity). Such streams typically contain many more bits than should be transmitted to maintain the desired level of secrecy. However, as the rate of the convolutional code is effectively controlled by puncturing, the parity streams 403 are punctured by a puncturing processor 405 according to a desired transmit rate 404, prior to transmission. Moreover, by varying the amount of puncturing applied, transceiver 100 can effectively trade-off the error-correcting capability of the code versus the amount of randomness that is generated. As with the first embodiment that uses block codes, adapting the convolutional coding rate to a channel condition, such as the channel interference levels, provides a level of optimization.

Continuing with this embodiment using convolutional error coding, a standard convolutional code decoder (e.g. a Viterbi decoder) is substituted for the parity bit decoder 204 in transceiver 200 (FIG. 2), where the systematic input is the locally generated difference vector. As with block codes, the nature of the code is assumed to be known publicly and therefore a family of codes may be used. However, since puncturing or repetition can be used to very effectively trade-off between error correction performance and residual secrecy, there is little need to utilize this.

Having established the necessary technique for generating a secret key based on the CIR reciprocity between two parties, extending this to a wider network is next considered. As discussed previously in the background, the problem is basically as follows. It is desirable for all the legitimate parties to share the same key. However, as each pair of transceivers shares a unique CIR, it is precisely this property that supports generation of perfect secrecy based on the CIR. If each pair of transceivers simply utilizes its own unique CIR, then each pair is likely to wind up with its own key. This makes transmission of common information in such a network highly impractical since the same message encrypted with different keys results in statistically independent instances of the cipher text. Transmitting independent information over the wireless channel is significantly less efficient then broadcasting the same information in such a channel. We now propose several methods for generating the same key in a network of more than two terminals.

A simple method based on spanning trees in general networks is as follows. The network nodes (transceivers) form into a tree and links (CIRs) for the connections not in a tree are ignored. Any feasible key length is established via some prior communication method, where feasible means that each link which is used in the tree can be used to generate a secret key of at least this size.

Each pair of connected nodes establishes a temporary key based on its own CIR in the manner described above for transceivers 100 and 200. Once this is done, the node at the root of the tree selects one of possibly several keys that it has as the permanent key. It then uses the temporary key established for all other links to communicate this secret key to its child nodes. The child nodes, in turn, use the temporary keys they have established to communicate the permanent key further down the tree and so on. Once the permanent key reaches all leaf nodes, the network shares a common secret key and common secret communication is enabled. Such communication does not have to take place according to the tree defined for the key distribution.

Note that a broadcasting scenario in which a single terminal acts as a server for the key distribution is a special case of the above case where the tree has only one level below the root (the server terminal). In this scenario the shortest temporary key can be made a permanent key and the root and leaf node which establish this particular key no longer need to communicate. The key is broadcast to other nodes using their temporary keys. While this is the simplest tree configuration, it is highly applicable in centralized networks, such as cellular networks, where the base station is a natural choice of root node or wireless LAN where the AP is a natural choice of a root node.

A more sophisticated approach for network generation according to the present invention now follows. Consider a network where each pair of nodes generates a secret key which is independent from all other secret keys generated. The nodes other than the generating pair also have no knowledge of the key. This model is in fact applicable in certain cases. One example is a wireless network where the nodes use the unique characteristics of their point-to-point channels to generate secret keys. As a consequence of the properties of such channels, the knowledge that any other node (whether a legitimate party or an adversary) may have about a particular pair's channel is typically negligible and thus the model of this example has direct applicability here. It is desirable to distribute a single secret key around this network.

Figure 5:
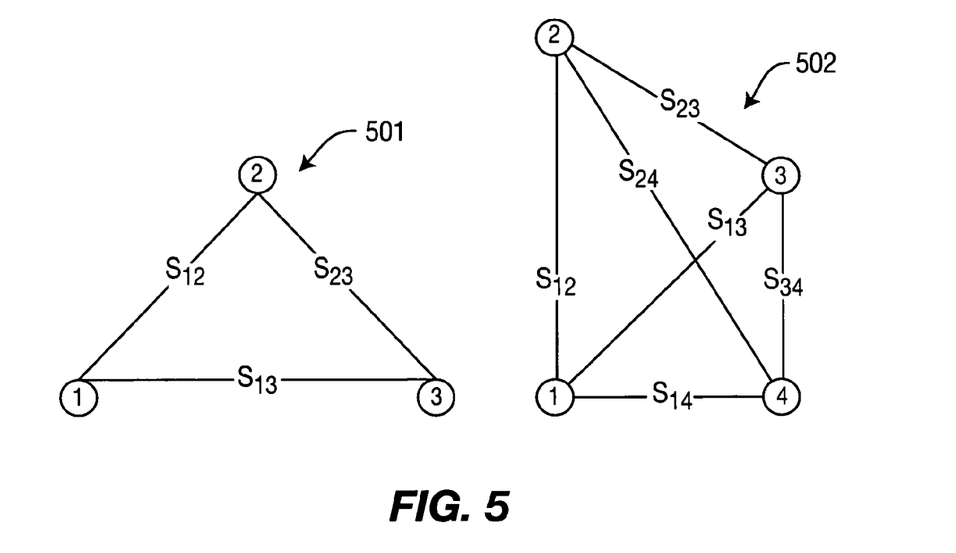
FIG. 5 shows a diagram of a three node network and a diagram of a four node network.

FIG. 5 shows a three node network 501 and a four node network 502. Let Skl represent the secret key shared by nodes k and l, with |Skl| being the length of this key. Starting with the three node network 501, assume that $|S_{12}|>|S_{13}|$ and consider the following strategy. First, node 1, acting as the server, establishes a joint key with nodes 2 and 3 using the above described broadcast approach. The minimum sized key of the two keys is selected resulting in a key of length $|S_{13}|$. However, nodes 1 and 2 still share a remainder secret string of length $|S_{12}|-|S_{13}|$ which remains unused. Depending on how $|S_{23}|$ compares with $|S_{12}|-|S_{13}|$, node 2 can use these remaining bits to transmit some or all of string $S_{23}$, which is independent from $S_{12}$ and $S_{13}$ by assumption. Thus, using this strategy the network can generate a shared key of length |S|:

$$|S|=\min[|S_{12}|,|S_{13}|+|S_{23}|] \quad \text{Equation 7}$$

Next, consider the four-node network 502, where $|S_{12}|>|S_{13}|>|S_{14}|$. Using the three-node network strategy described above, nodes 2, 3 and 4 share a common key $S_{\{2,3,4\}}$ that is independent of $S_{12}$, $S_{13}$, $S_{14}$. Then node 1 distributes string $S_{14}$ to nodes 2 and 3 using the broadcast-network approach, choosing $S_{14}$ because it is the shortest string. Then, node 2 uses the unused key portion of length $|S_{12}|-|S_{14}|$ to provide node 1 with as much of $S_{\{2,3,4\}}$ as possible. Thus, the network now shares a key of length |S|:

$$|S|=\min[|S_{12}|,|S_{14}+S_{\{2,3,4\}}|] \quad \text{Equation 8}$$

To generalize this approach, the following notation is introduced. Consider a network with k nodes indexed 1 through K and let Π denote the set of permutations on these indexes. Given a set of point-to-point secret key rates {Slk}, l≠k, the secret key rate achievable by the network as a whole is lower bounded by $$\max_{\pi \in \Pi} L_k(\pi) \quad \text{Equation 9a}$$

where $$L_k(\pi) = \min\left[\max_{1\le l<k}|S_{\pi(l)\pi(k)}|, \left(\min_{1\le l<k}|S_{\pi(l)\pi(k)}|\right) + L_{k-1}(\pi)\right] \quad \text{Equation 9b}$$

and $$L_2(\pi) = |S_{\pi(1)\pi(2)}| \quad \text{Equation 9c}$$

The present invention may be implemented in any type of wireless communication system, as desired. By way of example, the present invention may be implemented in any type of 802 type system. The present invention may also be implemented on an integrated circuit, such as an application specific integrated circuit (ASIC), multiple integrated circuits, logical programmable gate array (LPGA), multiple LPGAs, discrete components, or a combination of integrated circuit(s), LPGA(s), and discrete component(s). The present invention may also be implemented as software, hardware, or a digital signal processor as a WTRU, base station, access point, WLAN terminal, node or sensor implementation, in part or as entire system or network. The present invention is applicable to a physical layer (radio or digital baseband) or a security layer at the physical layer of a wireless communication system or device.

What is claimed is:

1. A method comprising:
    generating a plurality of channel impulse response (CIR) estimates at a wireless transmit/receive unit (WTRU) by estimating each of a plurality of radio signals received from a plurality of wireless transmit/receive units (WTRUs);
    generating a plurality of secret keys, each of the plurality of secret keys based on one of the plurality of CIR estimates and associated with one of the plurality of WTRUs;
    selecting a shared secret key by selecting a shortest length secret key from the plurality of secret keys; and
    communicating the shared secret key to each WTRU in the plurality of WTRUs using a secret key from among the plurality of secret keys associated with each respective recipient WTRU.

2. The method of claim 1, further comprising generating a perfectly secret encryption key from the shared secret key, wherein the generating the perfectly secret encryption key comprises:
    mapping the secret key according to a universal hash function which extracts entropy from the first CIR estimate and removes public bits.

3. The method of claim 1, further comprising generating a perfectly secret encryption key from the shared secret key, wherein the generating the perfectly secret encryption key comprises:
    entropy encoding using a Burrows-Wheeler Transform.

4. The method of claim 1, further comprising generating a perfectly secret encryption key from the shared secret key, wherein the generating the perfectly secret encryption key comprises:
    generating a non-systematic code for the secret key.

5. The method of claim 1, further comprising:
    deriving syndrome bits a first WTRU from among the plurality of WTRUs; and
    transmitting the syndrome bits to a second WTRU from among the plurality of WTRUs.

6. The method of claim 1, further comprising:
    deriving a block error correcting code having parity bits for a first WTRU from among the plurality of WTRUs; and
    transmitting the parity bits to a second WTRU from among the plurality of WTRUs.

7. The method of claim 1, further comprising:
    selecting an error correction code from a family of codes based on a channel condition.

8. The method of claim 7, wherein the error correction code is differentiated using at least one of a puncturing pattern and a repetition pattern.

9. The method of claim 7, wherein the channel condition includes an interference level.

10. The method of claim 7, wherein the channel condition includes a Doppler spread.

11. The method of claim 7, wherein the channel condition includes a Doppler spread or a direction of travel or a combination of a Doppler spread and a direction of travel.

12. The method of claim 7, wherein the channel condition is measured based on a bit error rate or a block error rate.

13. The method of claim 1, further comprising:
    deriving error detection bits;
    appending the error detection bits to at least one CIR estimate from among the plurality of CIR estimates; and
    encoding an error correction code including the error detection bits.

14. The method of claim 13, wherein the error detection code includes a plurality of cyclic redundancy check (CRC) bits.

15. The method of claim 1, wherein each of the plurality of radio signals comprises a frame.

16. The method of claim 1, further comprising:
performing a weak key analysis, such that the shared secret key is rejected based on extrinsic characteristics that affect secrecy according to predefined criteria.

17. The method of claim 16, where the predefined criteria includes a repetitive string within a defined period.

18. The method of claim 1, wherein the generating each of the plurality of CIR estimates comprises producing a plurality of CIR estimates for each radio signal of the plurality of radio signals, and generating each of the plurality of secret keys comprises continuously updating each of the plurality of secret keys by:
   filtering the plurality of CIR estimates for each radio signal of the plurality of radio signals to produce a predicted set of values for each radio signal of the plurality of radio signals;
   generating a difference vector between a current set of estimates for each radio signal of the plurality of radio signals and the predicted values for each radio signal of the plurality of radio signals; and
   updating each of the plurality of secret keys using the respective generated difference vector.

19. The method of claim 18, further comprising:
   generating at least one parity stream from each difference vector;
   performing puncturing or repetition on the parity stream at a rate according to a target transmit rate.

20. The method of claim 19, further comprising:
   adapting the puncturing rate or the repetition rate according to a channel condition.

21. The method of claim 20, wherein the channel condition comprises an interference level.

22. The method of claim 20, wherein the channel condition comprises a Doppler spread.

23. The method of claim 20, wherein the channel condition comprises one of a Doppler spread, a direction of travel, and a combination of a Doppler spread and a direction of travel.

24. The method of claim 20, wherein the channel conditions are measured based on at least one of a bit error rate and a block error rate.

25. The method of claim 1, wherein the generating a perfectly secret encryption key includes using a block for error correction of the secret key.

26. The method of claim 1, further comprising receiving from a first WTRU of the plurality of WTRUs a portion of a common key used by a subset of the plurality of WTRUs.

27. The method of claim 1, where the communicating comprises generating a tree graph of the plurality of other WTRUs.

28. A wireless transmit/receive unit (WTRU) comprising:
   a channel estimator configured to produce a plurality of channel impulse response (CIR) estimates, each based on one of a plurality of radio signals received from a plurality of wireless transmit/receive units (WTRUs);
   a post processor configured to:
      generate a plurality of secret keys, each of the plurality of secret keys based on one of the plurality of CIR estimates and associated with one of the plurality of WTRUs, and
      select a shared secret key by selecting a shortest length secret key from the plurality of secret keys; and
   a transmitter configured to communicate the shared secret key to each WTRU in the plurality of WTRUs using a secret key from among the plurality of secret keys associated with each respective recipient WTRU.

29. The WTRU of claim 28, further comprising an encryption processor configured to generate a perfectly secret encryption key from the shared secret key, wherein the encryption processor is configured to map the shared secret key according to a universal hash function that extracts entropy from a CIR estimate and removes public bits.

30. The WTRU of claim 28, further comprising an encryption processor configured to generate a perfectly secret encryption key from the shared secret key, wherein the encryption processor includes an entropy encoder configured to perform a Burrows-Wheeler Transform.

31. The WTRU of claim 28, further comprising:
   an error detection encoder configured to compute a plurality of cyclic redundancy check (CRC) bits according to an error detection code and to append the CRC bits to a CIR estimate from among the plurality of CIR estimates.

32. The WTRU of claim 28, further comprising an encryption processor configured to generate a perfectly secret encryption key from the shared secret key a non-systematic code for the shared secret key.

33. The WTRU of claim 28, further comprising:
   a weak key analyzer configured to reject the shared secret key based on extrinsic characteristics that affect secrecy according to predefined criteria.

34. The WTRU of claim 28 further comprising:
   a decoder configured to decode parity bits received from each of the plurality of WTRUs for error correction.

* * * * *